United States Patent
Lassl et al.

(10) Patent No.: US 11,421,991 B2
(45) Date of Patent: Aug. 23, 2022

(54) YAW-RATE SENSOR WITH A SUBSTRATE HAVING A MAIN EXTENSION PLANE, METHOD FOR MANUFACTURING A YAW-RATE SENSOR

(71) Applicant: Robert Bosch GmbH, Stuttgart (DE)

(72) Inventors: Andreas Lassl, Korntal-Muenchingen (DE); Burkhard Kuhlmann, Reutlingen (DE); Jan-Timo Liewald, Kusterdingen (DE); Matthias Kuehnel, Boeblingen (DE); Niels Bode, Stuttgart (DE); Nils Felix Kuhlmann, Ehningen (DE); Peter Degenfeld-Schonburg, Renningen (DE); Reinhard Neul, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 16/761,598

(22) PCT Filed: Oct. 25, 2018

(86) PCT No.: PCT/EP2018/079262
§ 371 (c)(1),
(2) Date: May 5, 2020

(87) PCT Pub. No.: WO2019/091788
PCT Pub. Date: May 16, 2019

(65) Prior Publication Data
US 2021/0172737 A1 Jun. 10, 2021

(30) Foreign Application Priority Data
Nov. 9, 2017 (DE) .................... 10 2017 219 933.4

(51) Int. Cl.
*G01C 19/5712* (2012.01)
*G01C 19/5747* (2012.01)
*G01C 19/5733* (2012.01)

(52) U.S. Cl.
CPC ..... *G01C 19/5712* (2013.01); *G01C 19/5733* (2013.01); *G01C 19/5747* (2013.01)

(58) Field of Classification Search
CPC ............ G01C 19/5705; G01C 19/5712; G01C 19/5747
See application file for complete search history.

(56) References Cited

U.S. PATENT DOCUMENTS 5,635,640 A * 6/1997 Geen ................. G01C 19/5712
310/309
2011/0023600 A1 2/2011 Wrede et al.
(Continued)

FOREIGN PATENT DOCUMENTS

DE 102009027897 A1 * 1/2011 ......... G01C 19/5712
DE 102013208828 A1 11/2014
(Continued)

OTHER PUBLICATIONS

International Search Report dated Mar. 8, 2019 in connection with International Application No. PCT/EP2018/079262.

*Primary Examiner* — Jill E Culler
*Assistant Examiner* — Ruben C Parco, Jr.
(74) *Attorney, Agent, or Firm* — Norton Rose Fulbright US LLP; Gerard Messina (57) ABSTRACT

A yaw-rate sensor with a substrate having a main extension plane. The yaw-rate sensor includes a rotation-element assembly, the rotation-element assembly being designed for detecting yaw rates prevailing in a first main extension axis of the substrate and yaw rates prevailing in a second main extension axis of the substrate perpendicular to the first main extension axis. The yaw-rate sensor has a sensor assembly,
(Continued)

the sensor assembly being designed for detecting a yaw rate prevailing perpendicular to the main extension plane of the substrate, both the sensor assembly and the rotation-element assembly being drivable with the aid of a drive assembly, the drive assembly being designed for driving movement along the first main extension axis.

8 Claims, 7 Drawing Sheets

(56) References Cited

U.S. PATENT DOCUMENTS

| | | | |
|---|---|---|---|
| 2012/0152019 A1* | 6/2012 | Kuhlmann | G01C 19/5712 73/504.12 |
| 2014/0260610 A1* | 9/2014 | McNeil | G01C 19/5712 73/504.12 |
| 2015/0052999 A1 | 2/2015 | Scheben et al. | |
| 2015/0377622 A1 | 12/2015 | Waters et al. | |
| 2016/0334215 A1 | 11/2016 | Kato | |
| 2017/0016726 A1 | 1/2017 | Hatass et al. | |
| 2018/0058853 A1* | 3/2018 | Jia | G01C 19/5712 |
| 2019/0120625 A1* | 4/2019 | Lo | G01C 19/5712 |
| 2020/0064134 A1* | 2/2020 | Gattere | G01C 19/5712 |

FOREIGN PATENT DOCUMENTS

| | | |
|---|---|---|
| DE | 102015209100 A1 | 11/2016 |
| EP | 2607907 A1 | 6/2013 |
| EP | 2610588 A2 | 7/2013 |
| EP | 3217146 A1 | 9/2017 |

\* cited by examiner

YAW-RATE SENSOR WITH A SUBSTRATE HAVING A MAIN EXTENSION PLANE, METHOD FOR MANUFACTURING A YAW-RATE SENSOR

FIELD

The present invention relates to a yaw-rate sensor.

BACKGROUND INFORMATION

Yaw-rate sensors are special micro-electromechanical systems (MEMS), with which yaw rates are able to be measured. Typically, sensors of this kind are produced on silicon-based substrates. Particularly in automotive applications, yaw-rate sensors are often used which typically are able to measure yaw rates about only one axis. Two-axis yaw-rate sensors for automotive applications are also conventional. However, sensors familiar from the related art have the disadvantage that yaw rates, which may prevail in different directions, are not able to be measured with high precision and with high reliability/robustness.

SUMMARY

An object of the present invention is to provide a yaw-rate sensor that allows yaw-rate measurements about three axes, and at the same time, is robust with respect to outer linear- and/or rotational accelerations, in order, namely, to ensure advantageous reliability/safety.

An example yaw-rate sensor of the present invention may have the advantage that the yaw-rate sensor has a sensor assembly, the sensor assembly being designed for detecting a yaw rate prevailing perpendicular to a main extension plane of the substrate, both the sensor assembly and the rotation-element assembly, which is designed for detecting yaw rates prevailing in a first main extension axis of the substrate and a second main extension axis of the substrate perpendicular to the first main extension axis, being able to be driven with the aid of a drive assembly, the drive assembly being designed for driving movement along the first main extension axis. According to the present invention, it is thereby advantageously possible that both the rotation-element assembly and the sensor assembly are able to be driven with the aid of the same drive assembly (e.g., the same drive frame). This yields the advantage that it is possible to save on other drive structures as well as terminal pads and the associated wiring in the sensor cores. Owing to the mutual drive, the application-specific integrated circuit (ASIC) involved may also be made more compact, especially since only one drive control circuit must be provided. In particular, the advantage of the mutual drive lies also in the avoidance of different drive frequencies of the individual sensor cores. According to the present invention, reciprocal influencing, e.g., due to parasitic cross-talk of the driving forces, is thus able to be minimized. In addition, the packaging becomes simpler and possible incorrect positions of the measuring axes relative to each other, owing to the tolerances of the monolithic sensor production, are determined, so that they are reducible by orders of magnitude compared to the layout of individual cores with the aid of mounting- and interconnection technology. A further advantage of a multi-axis sensor design according to the present invention is the avoidance of spurious modes, which in various ways may lead to a false signal of the sensor, e.g., due to (resonant) excitation by outer forces (vibration) or due to nonlinear cross-talk in the mechanics or the electrostatics of the system. According to the present invention, particularly advantageous reliability and safety of the yaw-rate sensor are attainable, permitting its use in the automotive sector, for example.

By contrast, in using conventional systems from the related art having three (identical) single-axis sensors (and separate drive structures), all sensors have the same spurious modes which, owing to the process, lie at slightly different frequencies, so that in the case of such sensors known from the related art, the total number of spurious modes triples disadvantageously in a contemplated frequency range.

In a multiaxis sensor element according to the present invention, it is possible to design the sensor element in such a way that it has less than the triple number of spurious modes. In the case of a three-axis sensor element, a marked reduction of the spurious modes is possible particularly if the same detection structures are designed in each instance to be sensitive for more than just one measuring axis.

According to the present invention, a yaw rate prevailing perpendicular to the main extension plane of the substrate is understood to mean that the axis of rotation of the yaw rate in question is perpendicular to the main extension plane of the substrate. The equivalent holds true for the yaw rates prevailing in the first or second main extension axis of the substrate.

Because the rotation-element assembly includes a first rotation element and a second rotation element, the first rotation element being drivable about a first axis of rotation with the aid of the drive assembly, the second rotation element being drivable about a second axis of rotation with the aid of the drive assembly, the first axis of rotation being perpendicular to the main extension plane, the second axis of rotation being perpendicular to the main extension plane, according to one specific embodiment of the present invention, it is advantageously possible that outer linear- and rotational accelerations generate no (or a minimized) differential signal. It is thereby feasible to perform a vibrationally robust measurement of the yaw rate about two axes (first and second main extension axes of the substrate). In addition, it is thereby possible that spurious modes occur only at a reduced level. Furthermore, according to one specific embodiment of the present invention, it is possible that detection electrodes are disposed below the first and second rotation elements, with whose aid tilting of the rotation elements about the first and/or second main extension axis is measurable.

Owing to the fact that the sensor assembly includes a first mass, a second mass and a third mass, the first and the second mass, at least in part, being designed to move in the same direction during the driving movement, the third mass, at least in part, being designed to move in the opposite direction relative to the movement of the first and second mass during the driving movement, and the third mass being disposed specifically in a direction parallel to the second main extension axis of the substrate between the first mass and the second mass, according to one specific embodiment of the present invention, it is possible to realize a particularly advantageous embodiment of the sensor assembly with three masses. In this context, movement in the same direction is understood to mean that the first and second mass move simultaneously in one (the same) direction along the first main extension axis. Meanwhile, the third mass moves in the direction opposite to that, thus, in the reverse direction.

It is possible that the first, second and third masses—in each case completely or in each case only partially (e.g., only a drive-frame component of the respective mass)—carry out the respective driving movement.

It is especially preferred that the third mass is essentially twice as heavy as the first and second mass, respectively.

Because a first drive structure of the drive assembly is assigned to the first mass, the first drive structure being connected mechanically to the first rotation element, and a second drive structure of the drive assembly is assigned to the second mass, the second drive structure being connected mechanically to the second rotation element, according to one specific embodiment of the present invention, it is possible to enable an advantageous coupling of the sensor assembly and the rotation-element assembly. This allows an especially advantageous bilateral drive of the two rotation elements. In this connection, it is possible, for example, to couple the first mass to the first rotation element with the aid of a first bar or web (and especially via a spring, as well) and to couple the second mass to the second rotation element with the aid of a second bar or web (and especially via a spring, as well). This yields the possibility that during the driving movement, a parallel driving movement of the first and second mass along the first main extension axis is able to be executed, and this movement of the masses continues in a rotational movement of the first and second rotation elements, and to be more precise, specifically in such a way that the first and second rotation elements execute a rotational movement, in phase opposition relative to each other, about the first and second axis of rotation, respectively.

Because the first rotation element and the second rotation element are connected with the aid of the spring structure, especially in such a way that a parallel tilt of the first and second rotation elements about the first main extension axis is suppressed and an anti-parallel tilt of the first and second rotation elements about the first main extension axis is made possible, according to one specific embodiment of the present invention, it is possible to realize an especially advantageous coupling of the first and second rotation elements. Preferably, it is possible that the spring structure is connected to at least one web structure of the third drive structure, namely, in such a way that with the aid of the spring structure and the web structure, a mechanical connection is produced between the third mass and the first rotation element as well as the second rotation element.

Owing to the fact that the first rotation element and the second rotation element are connected mechanically with the aid of a coupling structure, in particular, the coupling structure including at least one rocker structure, the rocker structure being formed in such a way that a parallel tilt of the first and second rotation elements about the second main extension axis is suppressed and an anti-parallel tilt of the first and second rotation elements about the second main extension axis is made possible, according to one specific embodiment of the present invention, it is feasible that only anti-parallel tilting of the first and second rotation elements is possible in the direction of the second main extension axis, which advantageously allows a purely anti-parallel detection movement of the two rotation elements.

Because the first rotation element and the second rotation element are connected mechanically with the aid of a further coupling structure, the further coupling structure being intersected by at least one web structure of the third drive structure, the web structure preferably being situated in the intersection area in an additional layer below the further coupling structure, according to one specific embodiment of the present invention, it is possible that the third drive structure is connected preferably to the first and second rotation elements, particularly in the area between the first and second rotation elements (in the direction of the second main extension axis). It is especially preferred that the third drive structure is connected to the spring structure disposed between the first and second rotation elements.

Because the first rotation element is connected to the substrate with the aid of a first suspension, the second rotation element being connected to the substrate with the aid of a second suspension, the first suspension in particular being situated partially in a central cutout in the first rotation element, the second suspension in particular being situated partially in a central cutout in the second rotation element, according to one specific embodiment of the present invention, an advantageous rotation of the first and second rotation elements about the first and second axis of rotation, respectively, is possible. Specifically, the first and second suspensions are formed in such a way that in each instance, the first and second rotation elements are able to rotate about the first and second axis of rotation, respectively, and at the same time, are tiltable about the first and second main extension axis.

Owing to the fact that the first mass is connected to the third mass with the aid of a first spring assembly, the second mass being connected to the third mass with the aid of a second spring assembly, according to one specific embodiment of the present invention, it is possible that the sensor assembly is designed in particularly advantageous manner to detect yaw rates prevailing perpendicular to the main extension plane of the substrate. In this connection, it is especially preferred that the first and second spring assemblies are designed in such a way that they allow an anti-phase movement of the first and third masses as well as of the second and third masses in the second main extension axis. In particular, it is preferred that a section of the first drive assembly (a first part of a drive frame) included by the first mass is connected to a section of the third drive assembly (a third part of a drive frame) included by the third mass with the aid of the first spring assembly. Likewise, it is preferred that a section of the second drive assembly (a second part of a drive frame) included by the second mass is connected to a section of the third drive assembly (a third part of a drive frame) included by the third mass with the aid of the second spring assembly.

Compared to the related art, an example method of the present invention for manufacturing a yaw-rate sensor according to one specific embodiment of the present invention has the advantages already described in connection with the yaw-rate sensor of the present invention or a specific embodiment of the yaw-rate sensor of the present invention.

Exemplary embodiments of the present invention are represented in the figures and explained in greater detail below.

DETAILED DESCRIPTION OF EXAMPLE EMBODIMENTS

Identical parts are always provided with the same reference numerals in the various figures, and therefore in each case are generally also designated or mentioned only once.

FIGS. 1, 2, 3 and 7 show exemplary rotation-element assemblies 10, 20 which are designed to detect yaw rates prevailing in a first main extension axis 100 of the substrate and yaw rates prevailing in a second main extension axis 200 of the substrate perpendicular to first main extension axis 100.

Exemplary sensor assemblies 40, which are designed for detecting a yaw rate prevailing perpendicular to main extension plane 100, 200 of the substrate, are shown in FIGS. 1, 2, 3 and 7.

Figure 1:
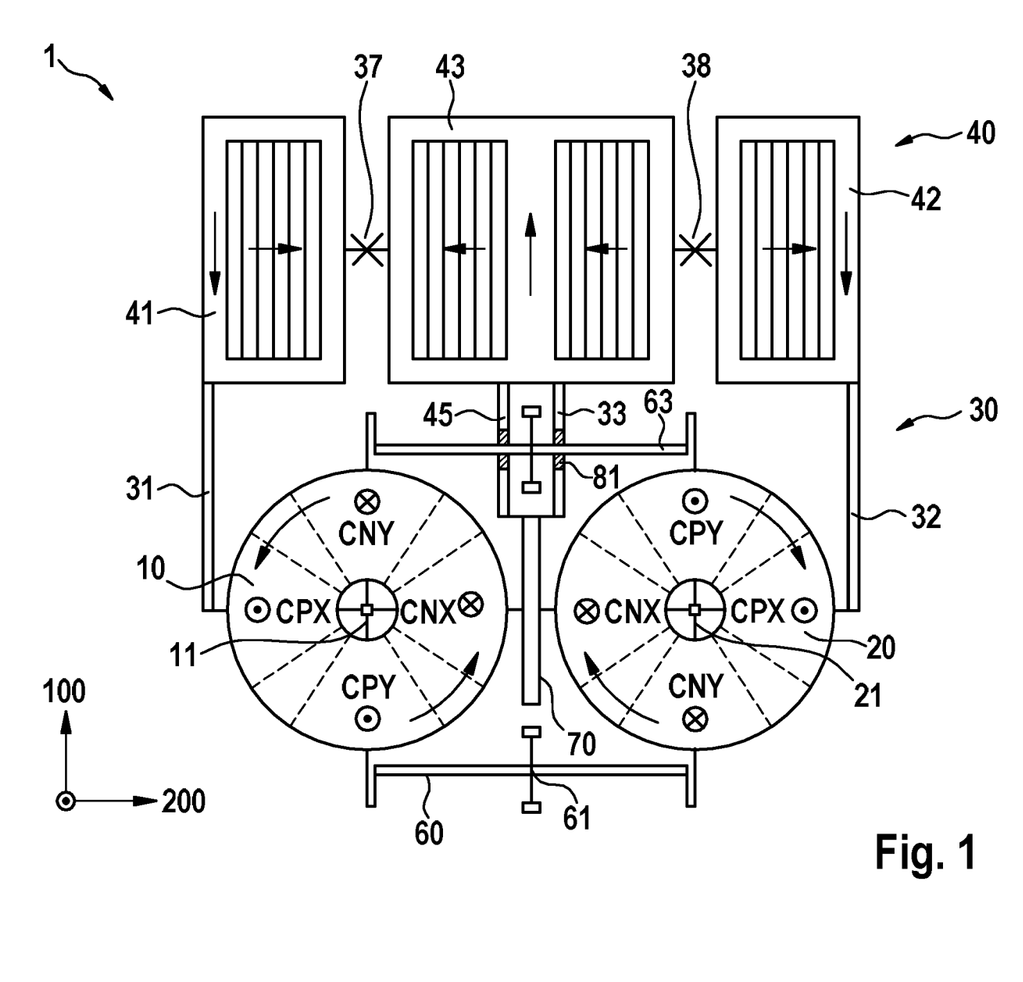
FIG. 1 shows a schematic top view of a yaw-rate sensor according to a first specific embodiment of the present invention.

FIG. 1 shows a schematic top view of a yaw-rate sensor 1 according to a first specific embodiment of the present invention. Yaw-rate sensor 1 includes a rotation-element assembly 10, 20 for detecting yaw rates prevailing in a first main extension axis 100 of the substrate and a second main extension axis 200 of the substrate perpendicular to first main extension axis 100. Rotation-element assembly 10, 20 includes a first rotation element 10 and a second rotation element 20, first rotation element 10 being drivable about a first axis of rotation by drive assembly 30 and second rotation element 20 being drivable about a second axis of rotation by drive assembly 30. First and second rotation elements 10, 20 each have a central cutout. The first and second axes of rotation are perpendicular to main extension plane 100, 200. In this context, first rotation element 10 is connected to the substrate with the aid of a first suspension 11, and second rotation element 20 is connected to the substrate with the aid of a second suspension 21. First suspension 11 is disposed (at least partially) in the central cutout in first rotation element 10 and second suspension 21 is disposed (at least partially) in the central cutout in second rotation element 20. The driving movement of first and second rotation elements 10, 20 takes place in phase opposition, as illustrated by the arrows drawn in in rotation elements 10, 20. Below and/or above rotation elements 10, 20, preferably detection electrodes are mounted, which are not shown. Tilting of rotation elements 10, 20 is able to be detected with the aid of such detection electrodes. In addition, yaw-rate sensor 1 includes a sensor assembly 40. Sensor assembly 40 is designed for detecting a yaw rate prevailing perpendicular to main extension plane 100, 200 of the substrate. Both sensor assembly 40 and rotation-element assembly 10, 20 are able to be driven with the aid of a drive assembly 30. In this context, drive assembly 30 is designed for driving movement along first main extension axis 100. Drive assembly 30 includes a first drive structure 31, a second drive structure 32 and a third drive structure 33. A first mass 41 of sensor assembly 40 is assigned to first drive structure 31. In particular, first drive structure 31 includes a bar. With the aid of the bar (and additionally with the aid of a spring), first mass 41 is connected to first rotation element 10. A second mass 42 of sensor assembly 40 is assigned to second drive structure 32. In particular, second drive structure 32 includes a bar. With the aid of the bar (and additionally a spring), second mass 42 is connected to second rotation element 20. Sensor assembly 40 furthermore includes a third mass 43. First and second masses 41, 42 are designed to move in the same direction during the driving movement. Third mass 43 is designed to move in the direction opposite to the movement of first and second masses 41, 42 (relative to main extension axis 100) during the driving movement. This is illustrated by the arrows drawn in at masses 41, 42, 43. In the specific embodiment shown, first, second and third masses 41, 42, 43 are essentially side-by-side, parallel to second main extension axis 200. First mass 41 and third mass 43 are connected here with the aid of a first spring assembly 37, and third mass 43 and second mass 42 are connected with the aid of a second spring assembly 38. In this context, first and second spring assemblies (or coupling structures) 37, 38 are designed in such a way that they allow the anti-symmetric movement of masses 41, 42, 43, thus, the equiphase movement of the first and second masses and the movement of the third mass, opposite in phase relative to it, in the direction of second main extension axis 200 (illustrated by the drawn-in arrows). Between first rotation element 10 and second rotation element 20, a spring structure 70 is disposed which connects the two rotation elements 10, 20 to each other. In particular, spring structure 70 is formed in such a way that a parallel tilt of first and second rotation elements 10, 20 about first main extension axis 100 is suppressed, and an anti-parallel tilt of the first and second rotation elements about first main extension axis 100 is made possible. Spring structure 70 is joined to a web structure 45 of third drive structure 33 of drive assembly 30. In particular, web structure 45 includes two bars that extend in parallel in the direction of the first main extension axis and are joined to spring structure 70 via a cross brace. Spring structure 70 and web structure 45 produce a mechanical connection between third mass 43 and first rotation element 10 as well as second rotation element 20. In addition, first rotation element 10 and second rotation element 20 are connected mechanically by a coupling structure 60 and a further coupling structure 63. Coupling structure 60 includes a rocker structure 61 that suppresses a parallel tilt of first and second rotation elements 10, 20 about second main extension axis 200, and permits an anti-parallel tilt of the first and second rotation elements about second main extension axis 200. The permitted anti-parallel tilt of first and second rotation elements 10, 20 in the direction parallel to second main extension axis 200 and the direction parallel to first main extension axis 100 is illustrated by the arrows (thus, the crosses and points) shown perpendicular to the top view (and therefore to main extension plane 100, 200) in first and second rotation elements 10, 20. Further coupling structure 63 is intersected, without contact, by web structure 45, particularly by the two bars of web structure 45. This is possible since web structure 45 (more specifically, the two bars) in this intersection area 81 is formed in an additional layer which is located beneath (thus, closer to the substrate than) further coupling structure 63 and especially also than the remaining areas of web structure 45 outside of intersection area 81. Further coupling structure 63 includes a further rocker structure 61 that suppresses a parallel tilt of first and second rotation elements 10, 20 about second main extension axis 200, and permits an anti-parallel tilt of the first and second rotation elements about second main extension axis 200. According to the present invention, it is possible that first rotation element 10, second rotation element 20 as well as sensor assembly 40 are able to be driven by the same drive assembly 30. Specifically, this means that with the aid of first, second and third drive structures 31, 32, 33, a driving movement of first, second and third masses 41, 42, 43 along first main extension axis 100 is transmitted to rotation elements 10, 20, and rotation elements 10, 20 are thereby able to be driven about the first and second axes of rotation.

Figure 2:
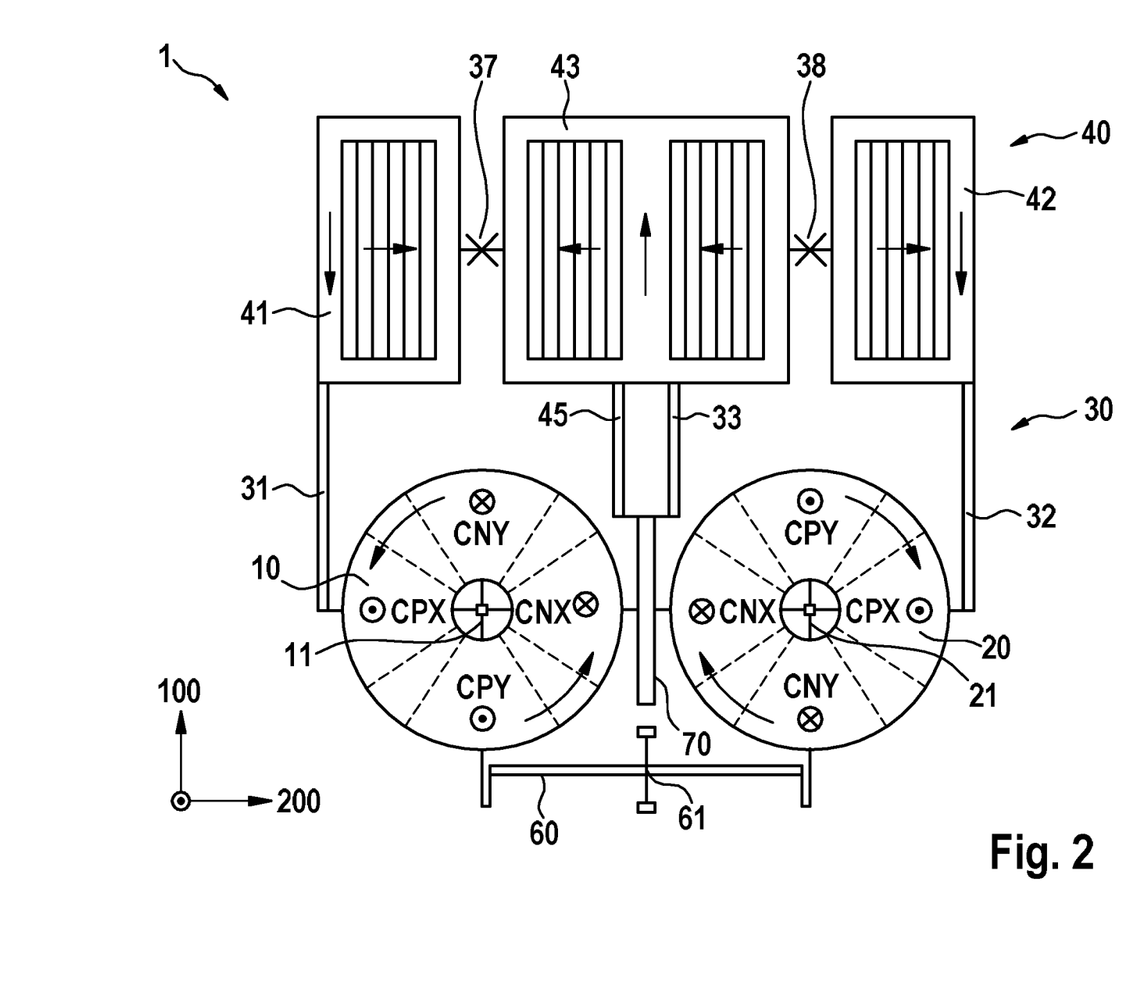
FIG. 2 shows a schematic top view of a yaw-rate sensor according to a second specific embodiment of the present invention.

FIG. 2 shows a schematic top view of a yaw-rate sensor 1 according to a second specific embodiment of the present invention. The second specific embodiment is similar to the first specific embodiment shown in FIG. 1, with the difference that no further coupling structure 63 is provided. It is thus possible that web structure 45 (and specifically its bars) is not disposed in an intersection area 81 in an additional layer, but rather in the same layer as the remaining elements.

Figure 3:
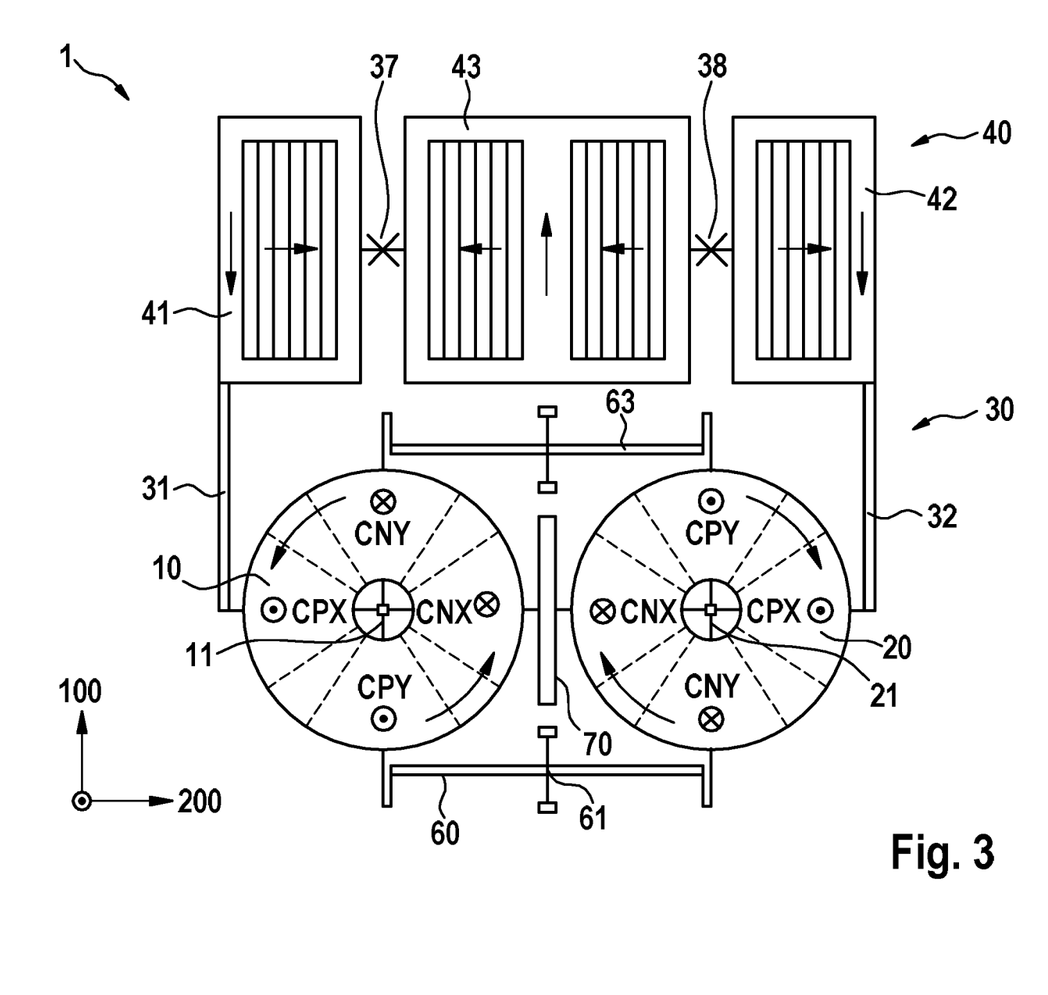
FIG. 3 shows a schematic top view of a yaw-rate sensor according to a third specific embodiment of the present invention.

FIG. 3 shows a schematic top view of a yaw-rate sensor 1 according to a third specific embodiment of the present invention. The third specific embodiment is similar to the first specific embodiment shown in FIG. 1, with the difference that no web structure 45 is provided. As a consequence, no mechanical connection is produced between spring structure 70 and third mass 43.

Figure 4:
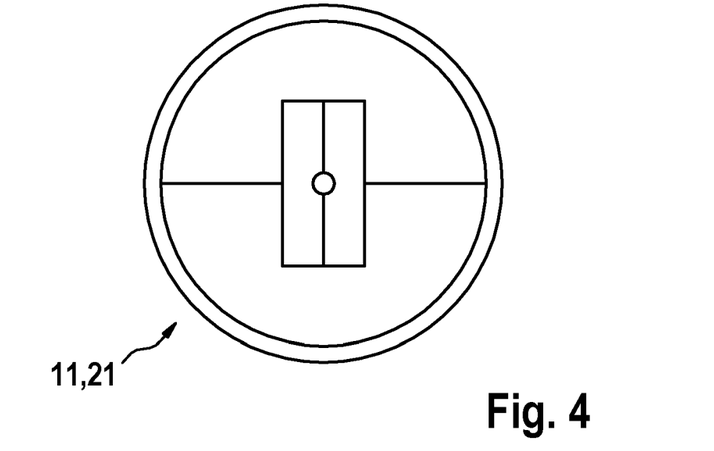
FIG. 4, FIG. 5 and FIG. 6 show schematic top views of a first suspension 11 and second suspension 21, respectively, according to specific embodiments of the present invention.
Figure 5:
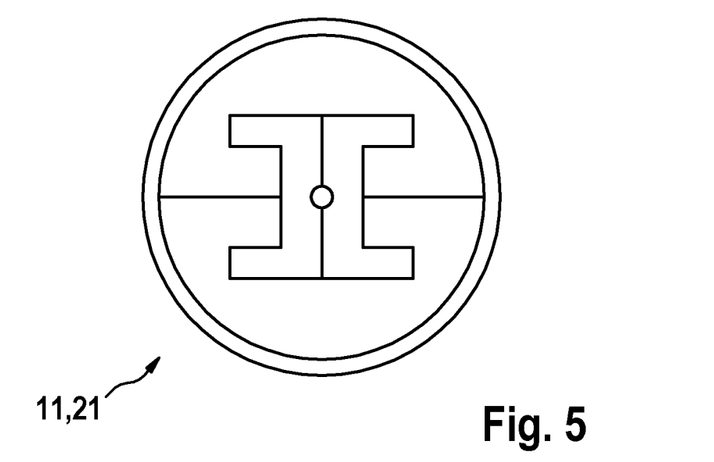
Figure 6:
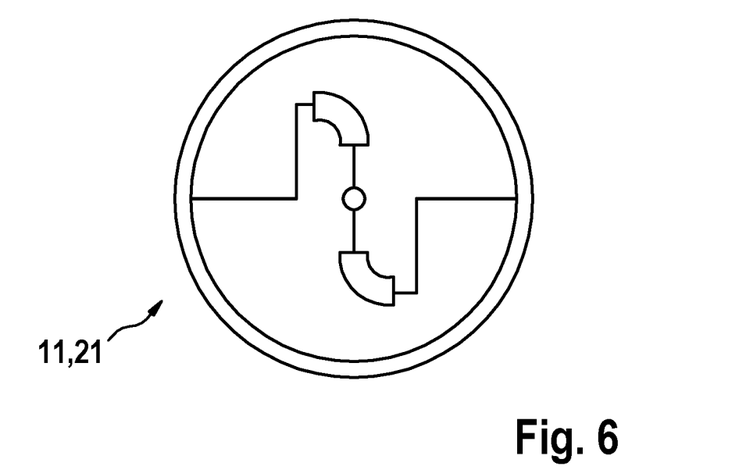

FIG. 4, FIG. 5 and FIG. 6 show schematic top views of a first suspension 11 of a first rotation element 10 or a second suspension 21 of a second rotation element 20 according to specific embodiments of the present invention. First and second suspensions 11, 21 on the substrate are each formed in such a way that first or second rotation element 10, 20 is able to execute a rotary motion/rotational movement about the first axis of rotation or about the second axis of rotation perpendicular to main extension plane 100, 200 of the substrate, and at the same time, tilting of first or second rotation element 10, 20 about first and second main extension axes 100, 200 (or about axes parallel to them) is possible.

Figure 7:
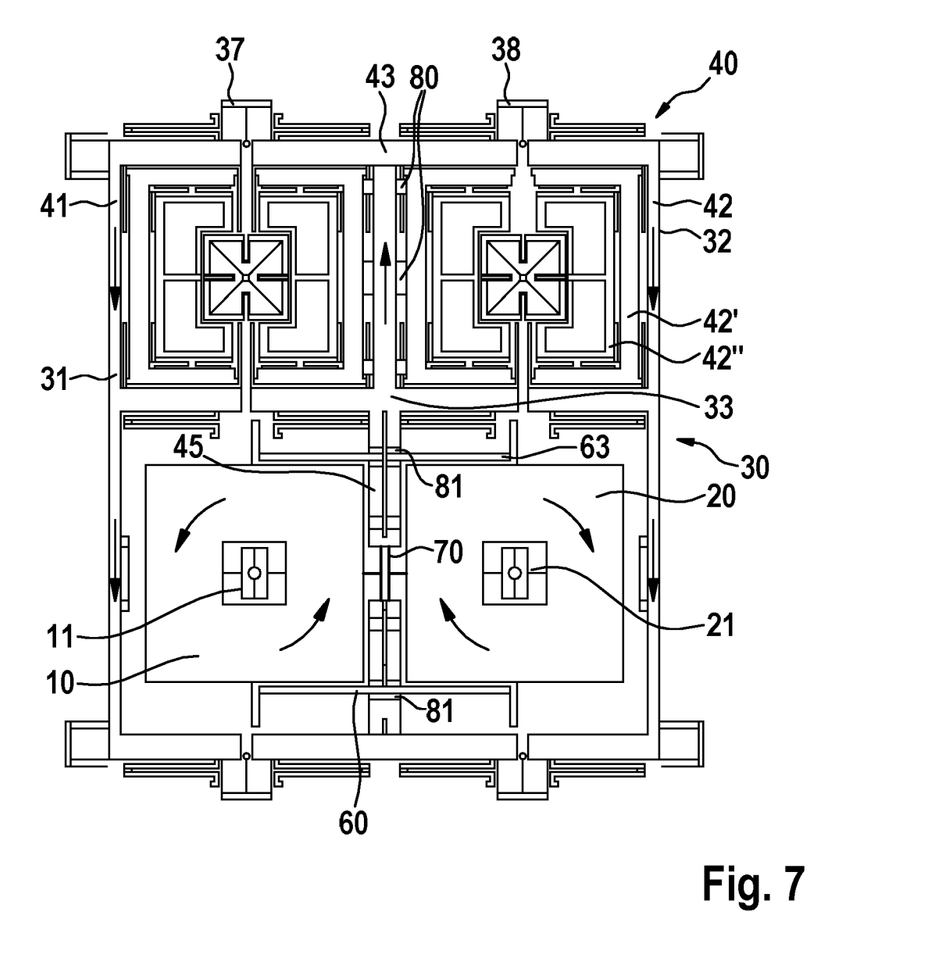
FIG. 7 shows a schematic top view of a yaw-rate sensor according to a fourth specific embodiment of the present invention.

FIG. 7 shows a schematic top view of a yaw-rate sensor according to a fourth specific embodiment of the present invention. The fourth specific embodiment includes the components represented schematically in FIG. 1. In addition, sensor assembly 40 in the fourth specific embodiment includes a detection structure which is able to move in a detection direction, a Coriolis structure which is able to move in a drive direction and detection direction, and a drive structure which is able to move in the drive direction. Each of masses 41, 42 and 43 includes a section of the detection structure, Coriolis structure and drive structure. For second mass 42, the associated section of Coriolis structure 42' and detection structure 42" are provided with reference numerals. The Coriolis structure is connected to the drive structure via springs. Likewise, the Coriolis structure is connected to the detection structure via springs. In the case of third mass 43, the Coriolis frame is separated by the drive frame. In order to ensure one common detection mode, a connection 80 may be produced via the additional layer. The sections of the detection structure of the various masses 41, 42, 43 are connected in each case via a coupling cross which allows an anti-phase movement of two adjacent masses and suppresses an equiphase movement. The individual sections of the drive frame are connected via coupling structures 37, 38 (coupling rockers), which likewise allow the anti-phase movement of adjacent masses 41, 42, 43 in the drive mode, and suppress the equiphase movement. Drive assembly 30 includes the drive structures of first, second and third masses 41, 42, 43, and in addition, is formed as a circumferential frame (especially with small breaks) about rotation elements 10, 20 and the Coriolis structures of sensor assembly 40, and is also connected between rotation elements 10, 20 with the aid of web structure 45, spring structure 70 and a further web structure. The additional layer is used to implement drive assembly 30 below or above coupling structure 60 or further coupling structure 63. According to the present invention, the additional layer may be markedly thinner than the layer in which the other components are situated (as shown, for example, in FIG. 8), so that web structure 45 and the further web structure, respectively, are usable as spiral springs for movements out of main extension plane 100, 200. For the detection movement, during which rotation elements 10, 20 tilt about first main extension axis 100, it is advantageous if drive assembly 30 (or the drive frame) near the connection to rotation elements 10, 20 is able to move out of the plane. In this specific embodiment, this is realized by further structures in the additional layer near spring structure 70 and at the outer frame.

In an alternative development of the present invention, sensor assembly 40 may also be made up of only two frames. The detection structures are then integrated into the Coriolis frame and move along in the driving movement.

Figure 8:
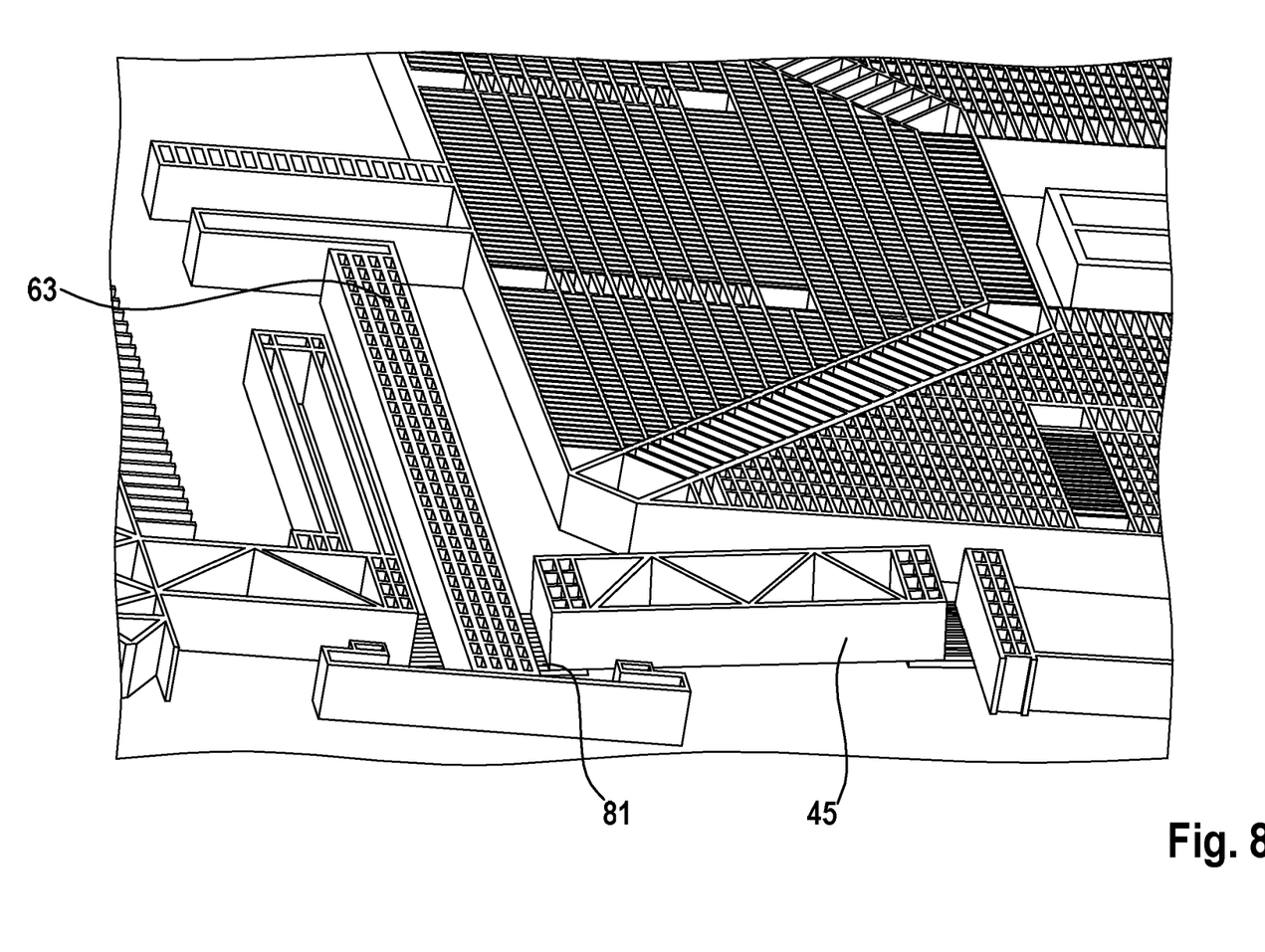
FIG. 8 shows schematically a section of a yaw-rate sensor according to one specific embodiment of the present invention.

FIG. 8 shows schematically a section of a yaw-rate sensor 1 according to one specific embodiment of the present invention. In particular, the additional layer may be discerned through the perspective view. In this additional layer, web structure 45 is disposed in intersection area 81 with further coupling structure 63. Preferably, the additional layer is thinner than the layer in which the other elements of yaw-rate sensor 1 are mostly formed.

Figure 9:
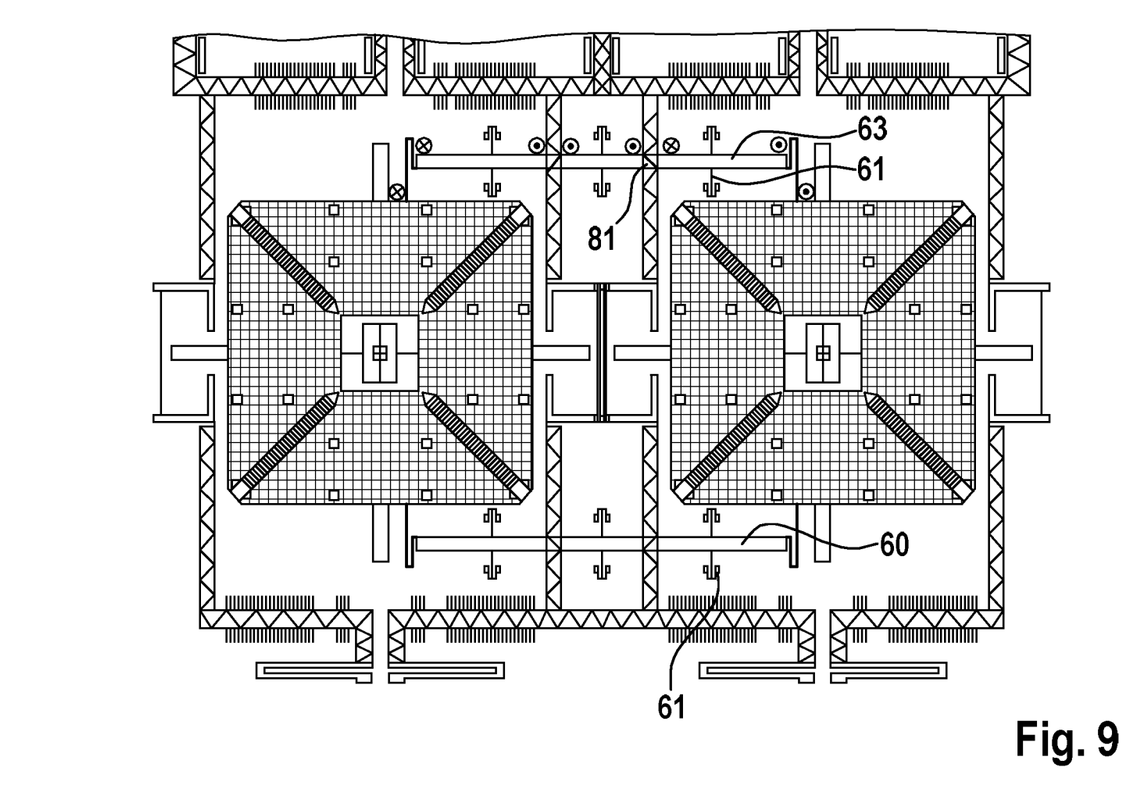
FIG. 9 shows schematically a section of a yaw-rate sensor according to a fifth specific embodiment of the present invention.

FIG. 9 shows schematically a section of a yaw-rate sensor according to a fifth specific embodiment of the present invention. In this specific embodiment, further coupling structure 63 (and not web structure 45) is disposed in the additional layer in intersection area 81 of further coupling structure 63 and web structure 45. Further coupling structure 63 includes three rocker structures 61 here. A desired detection movement of rotation elements 10, 20 is made possible by the threefold rocker structure, as represented by arrows pointing into the plane and out of the plane. In this specific embodiment, it is advantageous that the thinner additional layer rests during the driving movement and is not stressed. Coupling structure 60 has the same features, described above, as further coupling structure 63.

What is claimed is:
1. A yaw-rate sensor, comprising:
a substrate having a main extension plane;
a drive assembly having a drive structure, the drive structure having at least one web structure;
a rotation-element assembly configured to detect yaw rates prevailing in a first main extension axis of the substrate and yaw rates prevailing in a second main extension axis of the substrate perpendicular to the first main extension axis,
wherein the rotation-element assembly includes a first rotation element and a second rotation element, the first rotation element being drivable about a first axis of rotation using the drive assembly, the second rotation element being drivable about a second axis of rotation using the drive assembly, the first axis of rotation being perpendicular to the main extension plane, and the second axis of rotation being perpendicular to the main extension plane;
a spring structure;
a cross brace; and
a sensor assembly having a first mass, a second mass and a third mass and being configured to detect a yaw rate prevailing perpendicular to the main extension plane of the substrate, both the sensor assembly and the rotation-element assembly being drivable using the drive assembly, the drive assembly being configured to drive movement along the first main extension axis, wherein both the rotation-element assembly and the sensor assembly are driven via the same drive assembly, wherein the drive structure of the drive assembly is assigned to the third mass, and wherein the spring structure is joined to the at least one web structure in such a way that using the spring structure and the at least one web structure, a mechanical connection is produced between the third mass and the first rotation element and the second rotation element, wherein the at least one web structure includes two bars that extend in parallel in the direction of the first main extension axis and are joined to the spring structure via the cross brace, wherein the first mass and the second mass, at least in part, are configured to move in the same direction during the driving movement, the third mass, at least in part, is configured to move in an opposite direction relative to the movement of the first mass and the second mass during the driving movement, and the third mass is disposed in a direction parallel to the second main extension axis of the substrate between the first mass and the second mass.

2. The yaw-rate sensor as recited in claim 1, wherein a second drive structure of the drive assembly is assigned to the first mass, the second drive structure being connected mechanically to the first rotation element, a third drive structure of the drive assembly being assigned to the second mass, the third drive structure being connected mechanically to the second rotation element.

3. The yaw-rate sensor as recited in claim 1, wherein the spring structure is disposed between the first rotation element and the second rotation element, the first rotation element and the second rotation element being connected using the spring structure, in such a way that a parallel tilt of the first rotation element and the second rotation element about the first main extension axis is suppressed, and an anti-parallel tilt of the first rotation element and the second rotation element about the first main extension axis is made possible.

4. The yaw-rate sensor as recited in claim 1, wherein the first rotation element and the second rotation element are connected mechanically using a coupling structure, the coupling structure including at least one rocker structure, the rocker structure being formed in such a way that a parallel tilt of the first rotation element and the second rotation element about the second main extension axis is suppressed, and an anti- parallel tilt of the first rotation element and the second rotation element about the second main extension axis is made possible.

5. The yaw-rate sensor as recited in claim 1, wherein the first rotation element is connected to the substrate using a first suspension, the second rotation element being connected to the substrate using a second suspension, the first suspension being situated partially in a central cutout in the first rotation element, and the second suspension being situated partially in a central cutout in the second rotation element.

6. The yaw-rate sensor as recited in claim 1, wherein the first mass is connected to the third mass using a first spring assembly, and the second mass is connected to the third mass using a second spring assembly.

7. A yaw-rate sensor, comprising: a substrate having a main extension plane; a rotation-element assembly configured to detect yaw rates prevailing in a first main extension axis of the substrate and yaw rates prevailing in a second main extension axis of the substrate perpendicular to the first main extension axis; and a sensor assembly configured to detect a yaw rate prevailing perpendicular to the main extension plane of the substrate, both the sensor assembly and the rotation-element assembly being drivable using a drive assembly, the drive assembly being configured to drive movement along the first main extension axis, wherein the rotation-element assembly includes a first rotation element and a second rotation element, the first rotation element being drivable about a first axis of rotation using the drive assembly, the second rotation element being drivable about a second axis of rotation using the drive assembly, the first axis of rotation being perpendicular to the main extension plane, the second axis of rotation being perpendicular to the main extension plane, wherein the first rotation element and the second rotation element are connected mechanically using a coupling structure, the coupling structure including at least one rocker structure, the rocker structure being formed in such a way that a parallel tilt of the first rotation element and the second rotation element about the second main extension axis is suppressed, and an anti-parallel tilt of the first rotation element and the second rotation element about the second main extension axis is made possible, wherein a drive structure of the drive assembly is assigned to a mass, and wherein the first rotation element and the second rotation element are connected mechanically using a further coupling structure, the further coupling structure being intersected by at least one web structure of the drive structure, the web structure being situated in the intersection area in an additional layer below the further coupling structure.

8. A method for manufacturing a yaw-rate sensor, the method comprising providing a substrate having a main extension plane;

providing a drive assembly having a drive structure, the drive structure having at least one web structure;

providing a rotation-element assembly configured to detect yaw rates prevailing in a first main extension axis of the substrate and yaw rates prevailing in a second main extension axis of the substrate perpendicular to the first main extension axis, wherein the rotation-element assembly includes a first rotation element and a second rotation element, the first rotation element being drivable about a first axis of rotation using the drive assembly, the second rotation element being drivable about a second axis of rotation using the drive assembly, the first axis of rotation being perpendicular to the main extension plane, and the second axis of rotation being perpendicular to the main extension plane;

providing a spring structure;

providing a cross brace; and providing a sensor assembly having a first mass, a second mass and a third mass and being configured to detect a yaw rate prevailing perpendicular to the main extension plane of the substrate, both the sensor assembly and the rotation-element assembly being drivable using the drive assembly, the drive assembly being configured to drive movement along the first main extension axis, wherein both the rotation-element assembly and the sensor assembly are driven via the same drive assembly, wherein the drive structure of the drive assembly is assigned to the third mass, and wherein the spring structure is joined to the at least one web structure in such a way that using the spring structure and the at least one web structure, a mechanical connection is produced between the third mass and the first rotation element and the second rotation element, wherein the at least one web structure includes two bars that extend in parallel in the direction of the first main extension axis and are joined to the spring structure via the cross brace, wherein the first mass and the second mass, at least in part, are configured to move in the same direction during the driving movement, the third mass, at least in part, is configured to move in an opposite direction relative to the movement of the first mass and the second mass during the driving movement, and the third mass is disposed in a direction parallel to the second main extension axis of the substrate between the first mass and the second mass.

* * * * *